July 7, 1936.　　　C. CONOVER　　　2,046,368
METHOD OF PURIFYING PHTHALIC ANHYDRIDE
Original Filed Oct. 17, 1929
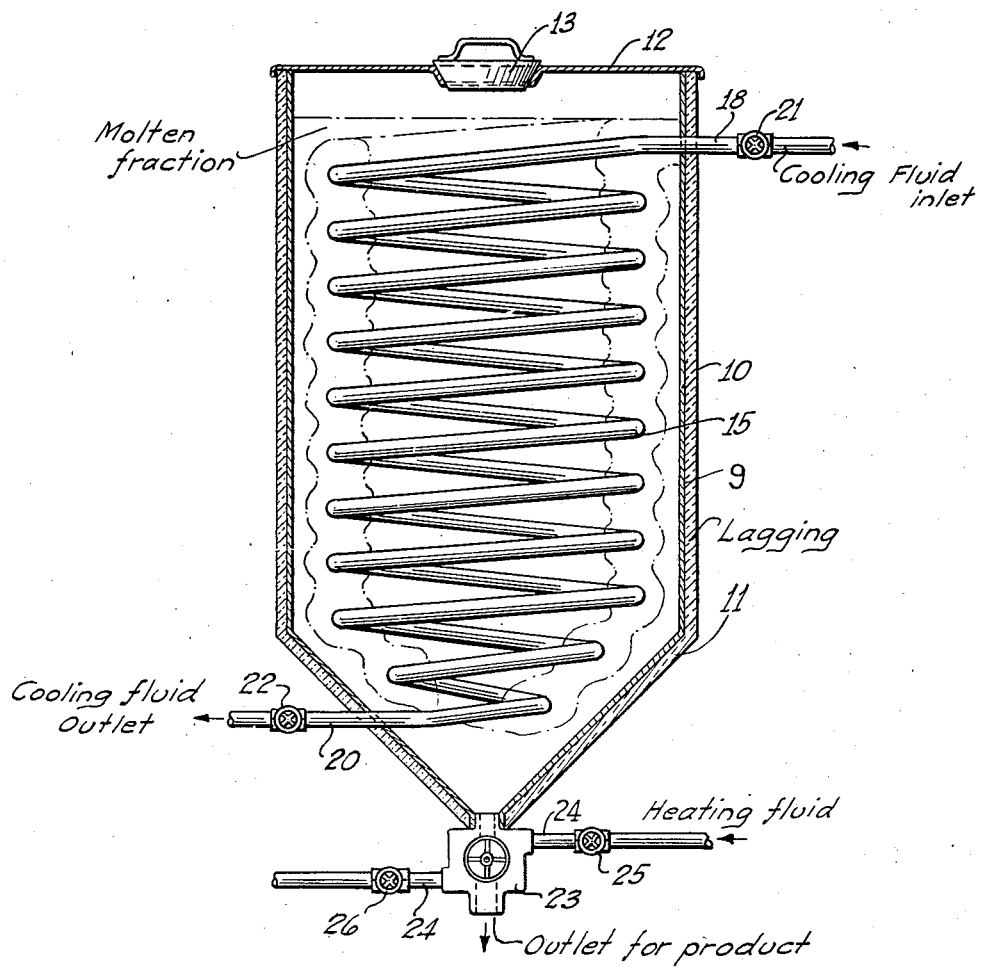
INVENTOR
Courtney Conover.
By Joseph R Mares
ATTORNEY Patented July 7, 1936

2,046,368

UNITED STATES PATENT OFFICE 2,046,368

METHOD OF PURIFYING PHTHALIC ANHYDRIDE

Courtney Conover, St. Louis, Mo., assignor to Monsanto Chemical Company

Application October 17, 1929, Serial No. 400,452
Renewed May 5, 1934

5 Claims. (Cl. 260—123)

This invention relates to the purification of phthalic anhydride and it has particular application to the purification of a product which contains foreign materials, especially those which are soluble in molten phthalic anhydride.

The single figure of the drawing is a cross sectional view of an apparatus employed in practicing the invention.

Large quantities of phthalic anhydride are consumed in the manufacture of esters, such as diethyl and dibutyl phthalate. The esters in turn are employed as plasticizers or high boiling solvents in the manufacture of lacquers and films. Diethyl phthalate is employed in the manufacture of perfumes in which capacity any odors would be objectionable.

Although the phthalic anhydride, which is made by the air oxidation of naphthalene, may be made in a relatively pure state containing less than .5% impurities, it has been found that the impurities which remain, combine with the alcohol in the esterification processes to form odoriferous bodies. Although these bodies do not have an unpleasant odor, the fact that the materials are used in lacquers and films renders them objectionable. In addition to odor-forming impurities, there may also be other materials which are objectionable, because they darken when exposed to ultra-violet light. Among the impurities present may be mentioned maleic acid, maleic anhydride, alpha-naphtho quinone, benzoic acid and naphthalene.

The melting point of phthalic anhydride which has been purified under the most stringent precautions is reported in the Critical Tables as being 130.84° C. I have found that by treating commercial phthalic anhydride according to the principles of my invention, I am able to prepare a product having a melting point of 131.35° C. and in so doing I have been able to improve, greatly, its stability in the presence of ultra-violet light.

According to my invention commercial phthalic anhydride is heated in a closed vessel until the entire mass is molten. Subsequently the mass is cooled slowly in the presence of cooling surfaces, care being exercised to avoid agitation, thereby depositing pure phthalic anhydride in solid phase on the cool surfaces. The impurities are retained in the liquid phase. The liquid phase is drained from the container, leaving the pure solid product intact on the cool surfaces. After the liquid phase is so withdrawn, heat is again applied to melt the product which may then be flaked, cast or employed directly in whatever capacity it is desired.

According to one embodiment of the invention, a closed lagged stationary tank is fitted with a charging door and a steam heated discharge valve. Within the tank is a coil through which water is circulated, the temperature of which may be controlled carefully by any suitable external means. Inasmuch as the temperature of the water must be sufficiently high to melt the phthalic anhydride and subsequently to cool the same, the construction must be such as to sustain an appreciable positive pressure. Both the tank and the coil, as well as any parts exposed to the material being treated, are constructed of an inert material, preferably aluminum.

The crude phthalic anhydride is charged through the door either as a solid or in a molten state and the temperature is raised to a point which will insure complete fusion. Thereafter the temperature of the water is lowered slowly. When the temperature reaches the crystallizing point of the phthalic anhydride, the rate of lowering is maintained at about .2° C. per hour. Under these conditions the pure phthalic anhydride deposits upon the cool surface as a dense strong mass. Care is exercised to avoid agitation of the molten mass in order that the solid particles will not form as a suspension throughout the liquid, thereby avoiding the necessity for filtration.

After about three-quarters of the phthalic anhydride has been deposited, the remaining molten anhydride, which contains the impurities, is drained through the discharge valve. Thereafter, the temperature of the water is raised in order to melt the solid product.

If desired the product may be subjected to a second purification. I have found that the second purification is unnecessary for most purposes, since the amount of impurities is so small that their presence cannot be detected by the odor of the esterified product.

An apparatus with which the invention may be practiced to advantage is disclosed in the accompanying drawing. This apparatus comprises a cylindrical tank (9), lagged as at (10), having a cone shaped bottom (11), and being provided with a cover (12), which includes a charging door (13). The tank is also provided with a coil (15) connected to inlet and outlet conduits (18) and (20), respectively, through which a cooling fluid or heating fluid, as may be required, is circulated. Valves (21) and (22) respectively, provide means for controlling the flow of fluid in the inlet and outlet conduits.

Molten material contained in the tank may be discharged through a steam heated valve (23), which is connected to heating fluid conduits (24), the flow of fluid in these conduits being controlled by means of conventional valves (25) and (26).

The operation of the embodiment of this apparatus is practically self-evident. The material to be purified is simply charged into the tank or container (9), through the door (13), and may be in either the molten or the solid state. If it is in the solid state, heating fluid is admitted to the coil (15), in order to melt it down. Material initially molten does not require heating. The molten material is then caused to cool slowly by the circulation of a cooling medium through the coil (15). After a sufficient amount of the material (usually about three fourths) has been crystallized from the liquid phase and collected upon the cool surfaces, the valves (23), preferably in heated state, in order to prevent chilling of the product, is opened and the liquid is drained away from the crystalline material. The latter may then be removed in any convenient manner.

It will be apparent, of course, that the heating and cooling medium, as well as the nature of the cooling surface, may be varied if desired. Similarly, the materials of construction may be changed, as well as the amount of the fraction which is discharged from the crystallizing tank in liquid form and in which there are to be found the impurities. These, together with other modifications, fall clearly within the spirit of the invention and I desire that it be limited only as indicated in the claims.

Attention is drawn to my copending application Serial No. 724,115, filed May 5, 1934, and claiming a form of apparatus suitable for conducting the process herein disclosed and claimed.

What I claim is:

1. The method of purifying phthalic anhydride obtained by the air oxidation of naphthalene that contains relatively small amounts of impurities which comprises melting the crude phthalic anhydride, cooling the molten mixture while maintaining the mass undisturbed whereby a portion of the mass is solidified at the same time leaving the impurities in solution and finally separating the impure liquid phase from the solid phase.

2. The method of purifying phthalic anhydride obtained by the air oxidation of naphthalene that contains relatively small amounts of impurities which comprises melting the crude material, cooling the molten mass slowly by means of relatively cool surfaces whereby a deposit of pure phthalic anhydride is formed thereon, at the same time leaving the impurities in the liquid phase and subsequently separating the liquid phase from the solid phase.

3. The method of purifying phthalic anhydride obtained by the air oxidation of naphthalene that comprise melting a crude product, subsequently cooling the same slowly and without disturbing the molten mixture whereby pure phthalic anhydride is deposited on a relatively cool surface and finally separating the liquid phase which contains the impurities.

4. The method of purifying phthalic anhydride obtained by the air oxidation of naphthalene which comprises melting the crude material, cooling the molten mass by contact with cool surfaces and without agitating the molten mass, and subsequently separating the liquid phase containing the impurities from the phthalic anhydride which has solidified on the cool surfaces.

5. In the purification of phthalic anhydride obtained by the air oxidation of naphthalene, whereby a molten mass of phthalic anhydride is cooled that step which comprises effecting the withdrawal of heat from the molten mass by means of cool surfaces while maintaining the molten mass substantially undisturbed to deposit the solid product securely on the cool surfaces.

COURTNEY CONOVER.